United States Patent
Shirvany

[15] 3,677,017
[45] July 18, 1972

[54] DOCK FENDER STRUCTURE

[72] Inventor: John Anoush Shirvany, Simi, Calif.
[73] Assignee: Byron Jackson, Inc., Long Beach, Calif.
[22] Filed: Oct. 20, 1970
[21] Appl. No.: 82,281

[52] U.S. Cl. .................................................61/48, 267/140
[51] Int. Cl. ..........................................................E02b 3/22
[58] Field of Search...............61/48; 114/219; 267/140, 141, 267/153

[56] References Cited

UNITED STATES PATENTS 3,172,268   3/1965   Gensheimer..............................61/48
3,294,254   12/1966  De Ment............................267/140 X
3,563,525   2/1971   Narabu........................................61/48

Primary Examiner—Jacob Shapiro
Attorney—Donald W. Banner, William S. McCurry and John W. Butcher

[57] ABSTRACT

A marine dock fender element having an elastomeric deflection body in connection with support plates at each end of the deflection body with deflection guide members associated with each support plate and the deflection body.

10 Claims, 5 Drawing Figures

PATENTED JUL 18 1972 3,677,017

INVENTOR
JOHN A. SHIRVANY
BY John O. Evans, Jr.
James M. Pepper

DOCK FENDER STRUCTURE

BACKGROUND OF THE INVENTION

This invention relates to marine fender structures for piers or docks wherein the fender structure incorporates a movable member having attached thereto marine vessel rubbing members. The movable member is connected to the pier or dock through a deflectable energy absorbing fender unit.

The purpose of such fender structures is to cushion the impact of marine vessels such as ships, barges and the like when moving into contact with the dock and to control the de-acceleration of such vessels without undue shock or undesirable bouncing of the vessel away from the dock.

Such fender structures are generally characterized by the following patents:

U.S. Pat. No. 523,422, Bailey, July 24, 1894
U.S. Pat. No. 2,027,800, Whitlock, Jan. 14, 1936
U.S. Pat. No. 2,655,005, Kinneman, Oct. 13, 1953
U.S. Pat. No. 3,381,484, Laughlin, May 7, 1968
U.S. Pat. No. 3,418,816, Kumazawa, Dec. 31, 1968
U.S. Pat. No. 3,457,729, Wannerog, July 29, 1969
U.S. Pat. No. 3,507,123, Mina, Apr. 21, 1970
Germany M1771 X1/65a Jorn Aug. 9, 1956

Specifically, the present invention is embodied in an improved deflectable fender element or unit of the general type described in U.S. Pat. No. 3,172,268 to Gensheimer, issued Mar. 9, 1965.

Fender structures such as shown by Gensheimer have been satisfactory as a practical matter and are presently used. There have been some disadvantages in their manufacture and use, such as large amounts of rubber being required in manufacture, the requirement for complex and correspondingly expensive molds used in manufacture, and subsequent separation of the support plates from the elastomer when subjected to severe usage. The present invention serves to overcome such disadvantages to a significant degree.

SUMMARY OF THE INVENTION

One object of the invention is to provide a deflectable dock fender member which is simple to fabricate with less elastomer yet retain all the desirable operating characteristics found in presently available structures.

Another object of this invention is to provide a deflectable dock fender member wherein the elastomer component of the member is less prone to separate from the support plates of the member through severe and strenuous usage.

This invention is embodied in a deflectable fender element suitable for use in a dock structure, such fender element comprising; an elongated deflection body formed of elastomeric material and having an elongated generally rectangular shape of substantially constant width and thickness. Two support plates suitable for attachment to a dock structure are each connected to a respective end of the deflection body through chemical, i.e., molecular bonding of the elastomer to each support plate. Two deflection guide members or plates are each attached in angularly inclined relation to each respective support plate to define a cavity between each guide plate and each support plate. Each guide plate has one or more holes defined therein whereby the elastomer of the deflection body extends in a continuous phase through such holes into such cavity and is molecularly bonded to all exposed surfaces of each guide plate in addition to the surface of each support plate. The amount of inclination of each guide plate is preselected to cause the uniform column of the deflection member to initially begin to deflect or bend in response to a predetermined compressive force applied to the ends of the deflection member and also to guide the deflection of such member in a predetermined direction. The holes and cavity formed by each guide plate, when filled with elastomer, provide a physical locking of the elastomer to the end plates in addition to the molecular bonding as provided.

DESCRIPTION OF THE PREFERRED EMBODIMENT

Figure 1:
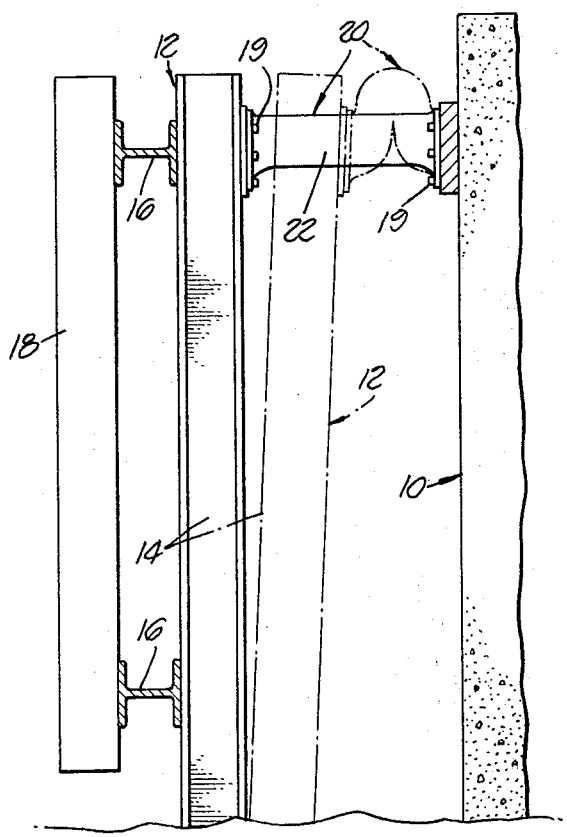
FIG. 1 is an elevational view taken 1—1 of FIG. 2 showing a marine fender structure which incorporates the deflectable fender element of this invention with dashed lines indicating such fender structure in deflected position.
Figure 2:
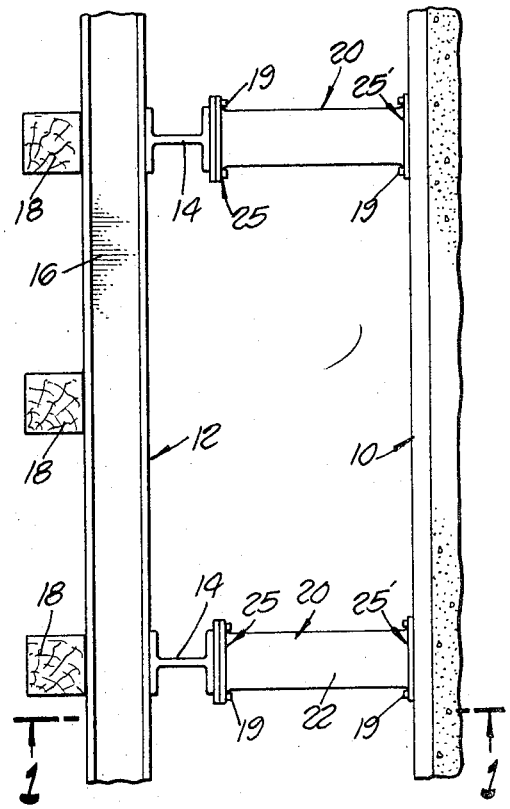
FIG. 2 is a plan view of the fender structure shown in FIG. 1.

Referring to FIGS. 1 and 2, there is shown a pier or dock structure 10 with a fender structure 12 connected thereto by means of bolts, welding or the like, bolts 19 being shown as an example. Fender structure 12 includes movable members shown as vertical beams 14 which are pivoted through flexure or other means (not shown) so as to be movable toward pier 10 from an initial position, as shown, to other positions such as shown in dashed lines in FIG. 1.

Fender structure 12 incorporates horizontal supporting means, shown as beams 16, to which are connnected rubbing members, shown as wooden timbers 18.

Fender 12 also incorporates deflection elements or bodies 20, which are shown to be connected to the beams 14 and to the pier 10 by means of bolts 19, as previously described, and which serve to control the magnitude and the rate of movement of the fender structure 12 toward and subsequently away from pier structure 10.

As is known and as described in the prior patents referenced above, it is desirable that a marine vessel approaching pier 10 be brought to rest adjacent to the pier with minimum impact, as may result from engagement of the vessel with the pier, to prevent damage to the hull of the vessel, the vessel's cargo and the pier. It is also desirable to reduce bouncing or rebound of the vessel away from the pier to a minimum. An elastomeric or resilient column which will resist initial compression through column action then bend or buckle through further compression has been found to be of substantial utility in that the resistance to force is linearly progressive through the column action, such as when a vessel initially moves against the fender structure 12, then becomes relatively constant as the column subsequently bends and the vessel and fender structure 12 move further toward the pier 10. At a position of fender structure 12 near pier 10, the column of fender unit 20 becomes fully deflected and further movement becomes substantially limited due to the increased forces necessary to compress the elastomeric mass of the fully deflected column. The return of the pier structure 12 to its initial position is regular and comparatively slow since the force which can be applied against the mass of the vessel by the column from its deflected posture is regular and of substantially less magnitude than applied by movement of the vessel toward the pier.

Figure 3:
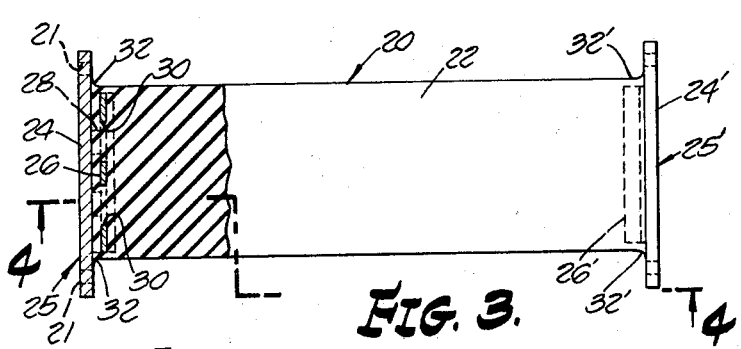
FIG. 3 is a plan view partly in longitudinal section, of the deflectable fender element of this invention.
Figure 5:
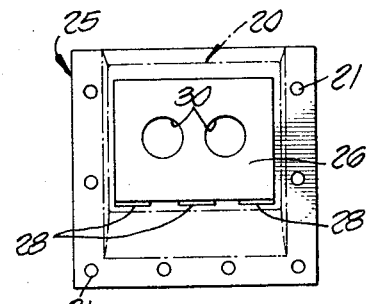
FIG. 5 is a transverse view taken at 5—5 of FIG. 4 of a support plate structure incorporated with the deflectable fender element.
Figure 4:
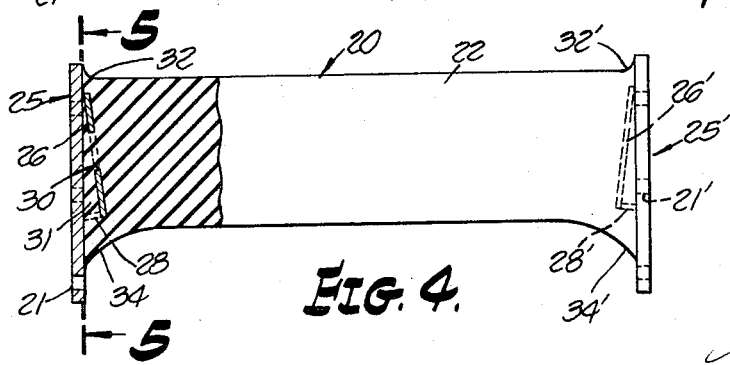
FIG. 4 is an elevational view taken at 4—4 of FIG. 3, partly in longitudinal section.

Referring now to FIGS. 3 and 4, deflection element or unit 20 incorporates an elongated elastomeric deflection column or body 22 which is of relatively constant width and thickness throughout its length. Connected to each end of deflection body 22 are support structures 25 and 25'. Another view of such support structure is shown in FIG. 5.

Referring to support structure 25, the structure incorporates a support plate 24 defining holes 21 about its outer perimeter for attachment as previously described. Support structure 25 also incorporates a deflection guide plate 26 mounted to support plate 24 in inclined relation to support plate 24 with one edge of guide plate 26 in contact with plate 24 and the opposing side of guide plate 26 supported away from support plate 24 by one or more web members 28. The members 24, 26 and 28 are securely fastened together as shown and described by means of welding, for example, to define a cavity 31. Guide plate 26 defines one or more openings 30 as shown.

Radial fillets 32 and 34 are provided about the perimeter of deflection body 22 at the juncture of deflection body 22 with support plate 24 as shown for the dual purposes of providing greater area of bonding of deflection body 22 with the surface or support plate 24 and also important, to reduce stress concentrations at the juncture of the perimeter of deflection body 22 and support plate 24 as would otherwise exist during flexure or bending of deflection body 22.

During manufacture of fender unit 20 the surfaces of support plate 24, the deflection guide plate 26 and the web members 28 which will be in contact with the elastomer of deflection body 22 as shown are treated so as to form a chemical or molecular bond between such surfaces and the elastomer when the components of fender unit 20 are molded and vulcanized together to form an integral structure. Such molding and molecular bonding are commonly known in the fabrication of machinery mounts and other rubber goods and need not be described herein.

The angle and orientation of inclination of guide plate 26 with respect to support plate 24 is preselected for two purposes.

The orientation of inclination of the guide plate 26 is determinant of the direction in which the guide plate 26 directs the bending or buckling of deflection body 22 with respect to support plate 24 and consequently with respect to fender structure 12. Such function is important in that the direction of bending of deflection body 22 can be preselected while maintaining the desirable features of uniform width and thickness throughout the effective length of deflection body 22 so as to retain a uniform column for simplicity of manufacture and for a minimum requirement of elastomer in fabrication. Also, some installations of fender unit 20 may have space limitations permitting deflection of body 22 only in one direction or in a most suitable direction. As shown in FIG. 4, for example, guide plate 26 is inclined upwardly at an obtuse angle with respect to support plate 24. Guide plate 26 thereby presents an upwardly directed bearing surface toward deflection body 22 to initiate upward buckling of deflection body 22 as shown in FIG. 1.

The angle of inclination of guide plate 26 with respect to support plate 24 is important in that a greater angle causes the deflection body 22 to more quickly depart from a column action in resisting longitudinal compressive stress and to begin a bending action which decreases the rate of increase in compressive stress necessary to cause further bending and deflection of member 22. As shown in FIG. 4, for example, guide plate 26 is mounted to support plate 24 in inclined relation such that an acute angle of about 7° may be measured between the plates, the complementary obtuse angle mentioned above then being about 173°. It will also be found that fender unit 20 as shown in the drawing is drawn in proportion such that relative dimensions established for a unit 20, as required for a fender structure 12 such as shown in FIGS. 1 and 2, will be appropriate.

Of further significance is that the provision of openings 30 and cavity 31 permits a continuous phase of the elastomer of deflection body 22 to be physically connected between a portion of the elastomer bonded within cavity 31 and the main portion of the elastomer extending away from support structure 25, thereby providing a combined molecular bond and a physical locking action between support structure 25 and deflection body 22.

The foregoing description as applied to support structure 25 also applies to support structure 25' and component elements thereof.

Elastomer, as used in this description, includes natural and synthetic rubber like materials having suitable deformation, recovery, and bonding characteristics with minimum tendency for permanent set upon deformation. In prototypes heretofore manufactured natural rubber has been found to be quite suitable, for example.

Having fully described one embodiment of the invention herein, it is understood that other embodiments could be provided and changes could be made in the construction thereof without departing from the spirit of the invention as described.

I claim:

1. A deflectable fender unit suitable for use in a dock structure comprising:
   a. an elongated deflection body of elastomeric material having generally uniform width and thickness; and
   b. a first support means and a second support means affixed to each respective end of said deflection body,
   c. each of said support means having a deflection guide surface bonded to said deflection body along a transverse surface thereof inclined to determine the direction of buckling of said deflection body.

2. The fender unit of claim 1 wherein each of said guide surfaces defines an opening therethrough and is disposed with each of said support means to define a cavity therebetween; said elastomeric material of said deflection body being continued from within said cavity through said opening as part of said deflection body and bonded to all contacted surfaces of said guide plate and said support plate.

3. The fender unit of claim 1 wherein the elastomeric material of said deflection body defines a radial fillet about the perimeter of said deflection body at the juncture of said body with each of said support means to increase the areas of bond between the elastomer of said body and each of said support means without increasing the width and thickness of said deflection body.

4. A deflectable fender unit suitable for use in a dock structure comprising:
   a. an elongated deflection body of elastomeric material having generally uniform width and thickness;
   b. a first support plate and a second support plate bonded to each respective end of said deflection body; and
   c. a first and a second deflection guide plate attached in oriented and inclined relation to each respective support plate and bonded to each respective end of said deflection body.

5. The fender unit of claim 4 wherein each of said guide plates defines an opening therethrough and is disposed with each of said support plates to define a cavity therebetween; said elastomeric material of said deflection body being continued from within said cavity through said opening as part of said deflection body and bonded to all contacted surfaces of said guide plate and said support plate.

6. The fender unit of claim 4 wherein the elastomeric material of said deflection body defines a radial fillet about the perimeter of said deflection body at the juncture of said body with each of said support plates to increase the areas of bond between the elastomer of said body and each of said support plates without increasing the width and thickness of said deflection body.

7. The fender unit of claim 5 wherein said support plates includes means for connecting said fender unit into a dock structure.

8. A support plate structure for a deflectable fender unit comprising:
   a. a transverse support plate adapted to be bonded to an end of an elastomeric deflection body,
   b. a deflection guide plate connected to said support plate with the outer surface of said guide plate disposed in inclined relation to the surface of said support plate which faces said deflection body.

9. The support plate structure of claim 8 wherein the support plate and the deflection guide plate are disposed to define a cavity therebetween and said deflection guide plate defines an opening providing communication for a continuous phase of the elastomeric material of said deflection body to be disposed within said cavity through said opening.

10. The support plate structure of claim 8 wherein said guide plate is supported in inclined relation from said support plate through connection with supporting web means.

* * * * *